US012637740B2

(12) United States Patent
Menou et al.

(10) Patent No.: US 12,637,740 B2
(45) Date of Patent: May 26, 2026

(54) TITANIUM ALLOY

(71) Applicants: SAFRAN, Paris (FR); TIMET SAVOIE, Ugine (FR); CENTRE NATIONAL DE LA RECHERCHE SCIENTIFIQUE, Paris (FR); UNIVERSITE DE LORRAINE, Nancy (FR); OFFICE NATIONAL D'ETUDES ET DE RECHERCHES AEROSPATIALES, Palaiseau (FR)

(72) Inventors: Edern Menou, Moissy-Cramayel (FR); Jérome Delfosse, Moissy-Cramayel (FR); Yvon Millet, Villeurbanne (FR)

(73) Assignees: SAFRAN, Paris (FR); TIMET SAVOIE, Ugine (FR); CENTRE NATIONAL DE LA RECHERCHE SCIENTIFIQUE, Paris (FR); UNIVERSITE DE LORRAINE, Nancy (FR); OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 0 days.

(21) Appl. No.: 18/871,244

(22) PCT Filed: Jun. 1, 2023

(86) PCT No.: PCT/FR2023/050772

§ 371 (c)(1),
(2) Date: Dec. 3, 2024

(87) PCT Pub. No.: WO2023/233114

PCT Pub. Date: Dec. 7, 2023

(65) Prior Publication Data

US 2025/0163545 A1 May 22, 2025

(30) Foreign Application Priority Data

Jun. 3, 2022 (FR) ....................................... 2205372

(51) Int. Cl.
*C22C 14/00* (2006.01)
*F01D 5/28* (2006.01)
*F01D 25/00* (2006.01)

(52) U.S. Cl.
CPC ................ *C22C 14/00* (2013.01); *F01D 5/28* (2013.01); *F01D 25/005* (2013.01); *F05D 2300/174* (2013.01)

(58) Field of Classification Search
CPC .......... C22C 14/00; C22F 1/183; C22F 1/002; C22B 34/12
See application file for complete search history.

(56) References Cited

U.S. PATENT DOCUMENTS 6,551,371 B1 * 4/2003 Furuta ..................... C22C 32/00 75/229

FOREIGN PATENT DOCUMENTS

| | | | |
|---|---|---|---|
| CN | 103572094 A | | 2/2014 |
| EP | 0 851 036 A1 | | 7/1998 |
| JP | H04-202729 A | | 7/1992 |
| JP | 3049767 B2 | * | 6/2000 |

OTHER PUBLICATIONS

NPL: on-line translation of JP 3049767 B2, Jun. 2000 (Year: 2000).*
Written Opinion of the International Searching Authority as issued in International Patent Application No. PCT/FR2023/050772, dated Aug. 23, 2023.
International Search Report as issued in International Patent Application No. PCT/FR2023/050772, dated Aug. 23, 2023.
Foltz, J., et al., "Introduction to Titanium and Its Alloys," *Heat Treating of Nonferrous Alloys*, Jun. 2016, ASM Handbook, vol. 4E, XP093011105, ISBN: 978-1-62708-169-6 pp. 481-497.
Office Action as issued in Chinese Patent Application No. 202380044683.8, dated Aug. 28, 2025.

* cited by examiner

*Primary Examiner* — Jie Yang
(74) *Attorney, Agent, or Firm* — CUSHMAN PARTNERS, LLC

(57) ABSTRACT

A titanium alloy includes, in content by weight 4.0% to 5.0% aluminium; 3.50% to 4.50% tin; 1.0% to 4.0% zirconium; 2.0% to 5.25% molybdenum; 1.0% to 2.50% niobium; 0.10% to 0.25% silicon; 0.10% to 0.18% oxygen; the remainder being titanium and unavoidable impurities, the alloy further being such that the Aleq criterion, referred to as equivalent aluminium content by weight, is less than or equal to 8.5%, the Aleq criterion being defined as Aleq=[Al]+[Sn]/3+[Zr]/6+10*[O] where, [Sn], [Zr] and [O] are the contents by weight of aluminium, tin, zirconium and oxygen respectively.

19 Claims, No Drawings

TITANIUM ALLOY

CROSS-REFERENCE TO RELATED APPLICATIONS

This application is the U.S. National Stage of PCT/FR2023/050772, filed Jun. 1, 2023, which in turn claims priority to French patent application number 2205372 filed Jun. 3, 2022. The content of these applications are incorporated herein by reference in their entireties.

TECHNICAL FIELD

The invention relates to the field of metal alloys and more precisely to alloys used in the aeronautics industry.

PRIOR ART

Reducing polluting emissions is a major issue for the aeronautical industry. An approach often put forward for reducing these emissions is to increase the efficiency of the propulsion systems used. However, the efficiency of these systems is limited by their operating temperature, itself limited by the constituent materials of the propulsion systems.

In addition, the constituent materials of the propulsion systems must also have good temperature resistance and mechanical properties that are sufficient for the application in propulsion systems, and especially in aeronautical turbomachines, in particular in terms of mechanical strength, resistance to oxidation and resistance to fatigue.

The use of titanium alloys is known for the manufacture of compressor discs, compressor blades, compressor impellers or turbomachine nozzles.

Over time, titanium alloys for discs, blades, impellers or turbomachine nozzles have undergone significant developments in chemical composition, in particular with the aim of improving their mechanical strength at temperature and their resistance to the environment in which these alloys are used. The complexity of the chemistry of these alloys can lead to destabilisation of their optimal microstructure, so the choice of the additive elements and their contents is not trivial.

The main advantages of these materials are to combine high mechanical strength, a density twice as low as that of nickel-based superalloys, and a reasonable resistance to oxidation and corrosion, all at temperatures less than 550° C.

In this respect, titanium alloys are competitive compared with steels and nickel-based superalloys at temperatures less than 550° C. However, an increase in the operating temperatures of turbomachines imposes an increase in temperature resistance, in particular with regard to commercial titanium alloys.

More precisely, the titanium alloys used most in the aeronautical industry are so-called "near-α" alloys comprising a very large fraction of the compact hexagonal α-phase and the latter generally having a good resistance to temperature. For example, the alloy Ti-6Al-2Sn-4Zr-2Mo is a representative of this family.

However, near-α titanium alloys are not competitive for applications at temperatures higher than 550° C., for several reasons.

Firstly, these alloys are sensitive to so-called "dwell fatigue". This fatigue can be described as a type of fatigue similar to the creep observed from ambient temperature involving a holding phase of several minutes under stress.

The service life of near-α alloys is currently limited by their sensitivity to dwell fatigue. More specifically, although dwell fatigue is not observed at high temperature, it can nevertheless appear during engine cooling cycles. In addition to their resistance to dwell fatigue, the desire to increase the operating temperature of aeronautical propulsion systems must be accompanied by an increase in the resistance to oxidation and in the mechanical strength of the materials used.

More specifically, the increase in operating temperature promotes the degradation of titanium alloys by corrosion, and in particular oxidation. Furthermore, the mechanical properties reduce with temperature and, at target temperatures higher than 550° C., the known near-α alloys do not have the resistances required by future applications.

Thus, in order to be able to increase the efficiencies of aeronautical propulsion systems, it is necessary to develop new compositions of titanium alloy.

DISCLOSURE OF THE INVENTION

The invention aims precisely to respond to this need, and for this purpose proposes alloys with compositions optimised to provide a resistance to dwell fatigue, resistance to the corrosion and mechanical strength compatible with use in an aeronautical turbomachine at operating temperatures up to 650° C.

For this purpose, the invention relates to a titanium alloy comprising, in content by weight:

- 4.0% to 5.0% aluminium;
- 3.50% to 4.50% tin;
- 1.0% to 4.0% zirconium,
- 2.0% to 5.25% molybdenum;
- 1.0% to 2.50% niobium;
- 0.10% to 0.25% silicon;
- 0.10% to 0.18% oxygen;

the remainder consisting of titanium and unavoidable impurities, the alloy having an equivalent aluminium content by weight, denoted Aleq, less than or equal to 8.5% and calculated by application of the following formula: Aleq=[Al]+[Sn]/3+[Zr]/6+10*[O] where [Al], [Sn], [Zr] and [O] are the contents by weight in the alloy of aluminium, tin, zirconium and oxygen respectively.

This alloy is intended for the manufacture of turbomachine components such as discs, blades, impellers or exhaust nozzles.

Throughout this application, and unless indicated otherwise, the content given for an element is the content by weight.

It is to the credit of the inventors that they have arrived at the described alloy compositions, the behaviours of which have been observed to be able to respond to the problem. Indeed, and among other properties, the alloys of the invention have:

- a content density of the order of that of existing titanium alloys;
- resistances to corrosion and to oxidation compatible with the environments of turbomachines, and this for temperatures up to at least 650° C., and at least higher than that of current commercially available alloys;
- a mechanical strength, in particular a resistance to dwell fatigue, greater than that of existing alloys;
- an adequate microstructural stability over the intended range of temperatures of use, in particular up to 650° C.;

a low sensitivity to the formation of deleterious phases, such as the @-phase, over the intended range of temperatures of use, in particular for temperatures up to at least 650° C.

The inventors have observed, in particular, that iron, chromium and nickel reduce the creep resistance of the alloy. Thus, for high temperature applications it is preferable to avoid the presence of these elements, as is the case in the alloys according to the invention.

In addition, the inventors have observed that an equivalent aluminium content by weight less than or equal to 8.5%, or even less than or equal to 8.0%, makes it possible to limit the fraction of the $\alpha_2$-phase in the alloy. The large fraction of $\alpha_2$-phase which can appear for alloys for which the equivalent aluminium contents by weight are greater than those described, is responsible for an undesirable embrittlement of the alloy. In addition, for alloys for which the equivalent aluminium content by weight is larger, it has been observed that the transformation kinetics of the $\alpha$-phase will be too large, leading to an increased sensitivity of the alloy to dwell fatigue, which is precisely what the alloys of the invention aim to avoid.

The inventors have succeeded, on the one hand, in identifying the importance of the criterion of equivalent aluminium content by weight as an important criterion for the phenomena present and, on the other hand, in proposing an optimisation of this, by precisely adjusting the content of other elements in order to satisfy the technical specifications of an alloy that can be used in an aeronautical turbomachine for which the operating temperature will be at least 550° C.

In an embodiment, the equivalent aluminium content by weight can be between 6.5% and 8.5%, or even between 6.5% and 8.0%.

In an embodiment, the alloy of the invention has an aluminium content by weight between 4.0% and 4.8%, or even between 4.0% and 4.7%.

The inventors have observed that this additional limitation on the aluminium content makes it possible to avoid the precipitation of too large a fraction of the $\alpha_2$-phase of the alloy, which improves the mechanical strength of the alloy, in particular by increasing its ductility.

In an embodiment, the alloy of the invention has a molybdenum content by weight between 4.50% and 5.25%.

The molybdenum stabilises the $\beta$-phase of the alloy, and contributes to the reinforcement by solid solution. The $\beta$-phase contributes to the increase in ductility of the alloy, and therefore to its formability.

In an embodiment, the silicon content by weight of the alloy can be between 0.1% and 0.15%.

Indeed, the silicon contributes to the reinforcement by solid solution and to the formation of silicides, in particular silicides with stoichiometry $M_3Si$ and $M_5Si_3$, where M represents another element, for example titanium, zirconium, the molybdenum or niobium. These silicides are beneficial for the creep resistance of the alloys, but too large a silicon content can, by contrast, lead to an excessive precipitation of silicides, which then harms the ductility of the alloy, and can become the initiation point for cracks leading to the premature degradation of the alloy.

The silicon ranges proposed are those for which an optimum could be obtained between these two effects.

In an embodiment, the zirconium content by weight can be between 1.0% and 2.0%.

Zirconium intends to improve the resistance to oxidation of the alloy. However, excessive additions of zirconium stabilise the $\alpha_2$-phase, too large a fraction of which reduces the ductility of the alloy and the values proposed are the optimum found between the two effects.

Another aspect of the invention relates to a turbomachine part comprising an alloy such as has just been described.

In an embodiment, such a part can be a compressor blade, a compressor disc, a compressor impeller, a turbomachine casing or a turbomachine nozzle.

Another aspect of the invention relates to a turbomachine comprising one or more turbomachine parts such as have just been described.

DESCRIPTION OF THE EMBODIMENTS

The invention is now described by means of examples, having a descriptive aim for illustrating certain embodiments of the invention. The examples given must not be interpreted as limiting the invention.

In order to characterise the properties of certain particular alloys of the invention, the inventors have chosen to use the results of numerical simulations. More precisely, 11 alloys according to the invention and three comparative alloys have been the subject of predictive measurements, in order to determine their ability to produce the expected abilities for an alloy.

The composition of the alloys in question is given in table 1 below. The three comparative examples are near-$\alpha$ titanium alloys frequently used in the aeronautical industry.

Comparative alloy 1, comp1, corresponds to the so-called Ti6242S alloy.

Comparative alloy 2, comp2, corresponds to the so-called Ti6246 alloy.

Comparative alloy 3, comp3, corresponds to the so-called IMI-834 alloy, for example commercially available under the commercial reference TIMETAL® 834 from TIMET.

TABLE 1

| Reference | Al | Sn | Zr | Mo | Nb | Si | O | Others |
|---|---|---|---|---|---|---|---|---|
| Ex1 | 5.0 | 4.0 | 2.0 | 2.0 | 1.9 | 0.1 | 0.12 | — |
| Ex2 | 4.0 | 4.0 | 2.0 | 2.0 | 1.9 | 0.1 | 0.12 | — |
| Ex3 | 4.8 | 4.5 | 2.0 | 2.0 | 1.9 | 0.1 | 0.12 | — |
| Ex4 | 4.8 | 4.0 | 4.0 | 2.0 | 1.9 | 0.1 | 0.12 | — |
| Ex5 | 4.8 | 4.0 | 2.0 | 2.0 | 1.0 | 0.1 | 0.12 | — |
| Ex6 | 4.8 | 4.0 | 2.0 | 2.0 | 2.5 | 0.1 | 0.12 | — |
| Ex7 | 4.8 | 4.0 | 2.0 | 2.0 | 1.9 | 0.25 | 0.12 | — |
| Ex8 | 4.7 | 3.7 | 3.3 | 2.7 | 1.9 | 0.13 | 0.11 | — |
| Ex9 | 4.7 | 3.7 | 3.3 | 2.7 | 1.9 | 0.22 | 0.11 | — |
| Ex10 | 4.6 | 4.1 | 1.5 | 4.5 | 1.9 | 0.13 | 0.13 | — |
| Ex11 | 4.6 | 4.1 | 1.5 | 5.25 | 1.9 | 0.13 | 0.13 | — |
| Comp1 | 6.0 | 2.0 | 4.0 | 2.0 | — | 0.10 | 0.11 | — |
| Comp2 | 6.0 | 2.0 | 4.0 | 6.0 | — | — | 0.11 | — |
| Comp3 | 5.8 | 4.0 | 3.5 | 0.5 | 0.7 | 0.35 | 0.12 | 0.06 C |

In order to understand the examples which follow and the conclusions which could be made, it should be noted that an alloy must be evaluated for all of its properties, and not for one property taken in isolation.

Thus, for example, if only the density were observed, the impression would be given that alloy comp3 is the most promising, but this would be without considering that this alloy cannot be used at high temperature because of the too low resistance to dwell fatigue visible in its $\alpha_2$-phase content and the too high a fraction gradient at the $\beta$-transus, as will be apparent on reading tables 2 and 5.

The optimisation and choice of a particular alloy is always the result of a compromise between the different properties, and it is very important to regard all of the important parameters which will be presented below, in order to understand the particular advantage of the alloys of the invention for solving the technical problem.

The examples which follow aim to provide comparisons between the various examples according to the invention, and to show that these examples all have better properties than the comparative alloys, none of which is suitable for use under the conventional conditions of an aeronautical turbomachine having an operating temperature between 550° C. and 650° C.

The inventors first determined the density of the various alloys.

The density was determined using a law of mixtures, weighting the density of each element by its content by weight, the whole being reduced by 2.5%. Thus, the density of an alloy ρ can be written according to the formula below in which $w_i$ is the mass percentage of element i, and $\rho_i$ is its density.

$$\rho = 0.975 \times \sum_i \omega_i \rho_i \quad \text{[Math. 1]}$$

This formula gives, for the comparative examples comp1 to comp3, errors of order 1% which are judged acceptable.

The densities of the examples and the comparative examples are given in table 2.

TABLE 2

| Reference | ρ (g · cm$^{-3}$ |
|---|---|
| Ex1 | 4.64 |
| Ex2 | 4.65 |
| Ex3 | 4.65 |
| Ex4 | 4.68 |
| Ex5 | 4.60 |
| Ex6 | 4.66 |
| Ex7 | 4.64 |
| Ex8 | 4.70 |
| Ex9 | 4.69 |
| Ex10 | 4.77 |
| Ex11 | 4.82 |
| Comp1 | 4.53 |
| Comp2 | 4.75 |
| Comp3 | 4.51 |

The different alloys have densities comparable to those of the alloys and very often lower.

A second element for comparison of the alloys according to the invention with the alloys of the prior art is their parabolic oxidation rate constant at 650° C., denoted $k_p$. This constant quantifies the oxidation kinetics of an alloy (mass gain). The higher its value, the more rapidly the surface oxide forms or, equivalently, the more rapidly oxygen diffuses within the alloy. It is therefore desired that this parameter be low as possible for the targeted applications.

Table 3 list the parabolic oxidation rate constants for the examples and comparative examples. For the examples according to the invention and the comparative examples, the constants $k_p$ are obtained using a regression model based on the collection and exploitation of experimental data.

TABLE 3

| Reference | kp at 650° C. (×10$^{13}$ g$^2$/cm$^4$/s) |
|---|---|
| Ex1 | 1.68 |
| Ex2 | 1.68 |
| Ex3 | 1.53 |
| Ex4 | 1.68 |
| Ex5 | 2.26 |
| Ex6 | 1.34 |
| Ex7 | 1.14 |
| Ex8 | 1.60 |
| Ex9 | 1.32 |
| Ex10 | 1.49 |
| Ex11 | 1.49 |
| Comp1 | 3.56 |
| Comp2 | 4.35 |
| Comp3 | 1.52 |

Table 3 illustrates that the alloys of the invention have a better resistance to oxidation at 650° C. than the comparative examples comp1 and comp2.

In addition, it should be noted that the values are at least comparable to the third comparative example which is that having the best resistance to oxidation.

The alloys according to the invention are again compared with the comparative examples for their mechanical properties at ambient temperature and at temperature.

For this purpose, the values of tensile strength Rm divided by the density of the alloy are listed in table 4. Table 4 also comprises the elongation at break A % at 20° C.

TABLE 4

| Reference | Rm/ρ at 20° C. (MPa · g$^{-1}$ · cm$^3$) | Rm/ρ at 650° C. (aged state - MPa · g$^{-1}$ · cm$^3$) | A % at 20° C. (%) |
|---|---|---|---|
| Ex1 | 224 | 111 | 8.4 |
| Ex2 | 213 | 95 | 13.2 |
| Ex3 | 227 | 110 | 8.4 |
| Ex4 | 229 | 114 | 7.7 |
| Ex5 | 224 | 109 | 9.0 |
| Ex6 | 221 | 107 | 9.0 |
| Ex7 | 232 | 118 | 6.7 |
| Ex8 | 227 | 111 | 7.5 |
| Ex9 | 233 | 117 | 6.0 |
| Ex10 | 252 | 110 | 5.7 |
| Ex11 | 261 | 112 | 4.6 |
| Comp1 | 214 | 119 | 9.3 |
| Comp2 | 264 | 128 | 2.6 |
| Comp3 | 233 | 140 | 5.6 |

The values reported in table 4 are obtained by a regression model based on the collection and exploitation of experimental data.

For the desired applications, it is preferable that the values of mechanical strength, as well as of elongation, are the highest possible.

Table 4 illustrates that the alloys according to the invention have mechanical strength at ambient temperature and at temperature of at least the same order as those of the alloys of the prior art.

Table 4 also illustrates that the alloys according to the invention allow compromises of properties which are not accessible for alloys of the prior art. For example, even if none of them has a mechanical strength at 650° C. greater than that of the alloy comp3, almost all have a higher elongation at break.

Finally, certain thermodynamic properties of the alloys of the invention, which make it possible to ensure their good temperature resistance, have also been evaluated by numerical simulation.

The simulations are carried out by thermodynamic equilibrium calculations performed by the CALPHAD method using the commercial thermodynamic database TCTI3 (Thermo-Calc Software AB, Sweden).

The various thermodynamic properties thus evaluated are presented in table 5 below.

TABLE 5

| Reference | B-transus (° C.) | Δα (% mol.) | Fraction of α2-phase at 650° C. (% mol.) | Fraction of silicides at 650° C. (% mol.) | Gradient of α fraction at the β-transus (% mol/° C.) |
|---|---|---|---|---|---|
| Ex1 | 955 | 1.7 | — | 0.4 | −0.41 |
| Ex2 | 938 | 1.8 | — | 0.6 | −0.37 |
| Ex3 | 950 | 1.9 | 0.2 | 0.4 | −0.34 |
| Ex4 | 944 | 1.6 | — | 0.6 | −0.89 |
| Ex5 | 959 | 1.6 | — | 0.4 | −0.47 |
| Ex6 | 946 | 1.8 | — | 0.4 | −0.36 |
| Ex7 | 951 | 1.8 | — | 1.1 | −0.42 |
| Ex8 | 942 | 1.5 | — | 0.8 | −0.63 |
| Ex9 | 942 | 1.6 | — | 1.5 | −0.63 |
| Ex10 | 976 | 2.1 | — | 0.6 | −0.12 |
| Ex11 | 986 | 2.5 | — | 0.6 | −0.09 |
| Comp1 | 998 | 0.7 | — | 0.4 | −1.34 |
| Comp2 | 965 | 2.5 | — | — | −0.58 |
| Comp3 | 992 | 1.8 | 15.0 | 1.6 | −1.05 |

In table 5, the "-" sign means that the value obtained was not significant, and that the numerical result can be taken as 0.

The β-transus temperature characterises the stability range of the β-phase. The lower the β-transus temperature, the more stable the β domain.

The column Δa represents the absolute difference between the α-phase fraction at equilibrium at 700° C. and the α-phase fraction at equilibrium at 650° C. This indicator of the amplitude of the modification of the constitution of an alloy between these two temperatures is witness to the stability of the alloy at these temperatures close to the intended temperatures of use. The objective is to maintain a low variation Δa, and it can be noted that all the alloys of the invention have a value of Δa less than that of the comparative example Comp2.

Table 5 again includes a column indicating the $\alpha_2$-phase content at equilibrium at 650° C.

If a zero content of $\alpha_2$-phase is desirable, a low content is however not prohibited, because it can be observed that this phase contributes to the reinforcement by precipitation.

Table 5 also includes the content of silicides. The presence of silicides in the alloy ensures a certain reinforcement by precipitation which is desirable, and which is furthermore observed for all of the alloys according to the invention.

Finally, table 5 describes the α-fraction gradient at the β-transus. This value is an indicator of the transformation kinetics of the β-phase on cooling. It has been observed that too high a value (in absolute value) is associated with an alloy in which the α-precipitates have a morphology increasing the sensitivity of the alloy to dwell fatigue.

Furthermore, alloys comp1 and comp3 are known to be sensitive to this type of fatigue and have a relatively high value of α-gradient at the β-transus (in absolute value).

Conversely it is known that the alloy comp2 is much less subject to dwell fatigue. Since the values for the alloys according to the invention are relatively close to the value of the gradient for alloy comp2, and in any case greatly less than (in absolute value) the values for alloys comp1 or comp3, it is expected that the alloys according to the invention have good resistance to dwell fatigue.

From the examples which have just been given, it can be seen, in particular, that the alloys of the comparative examples comp1 and comp2 have very high parabolic oxidation rate constants compared with the rest of the alloys considered, while the comparative alloys comp3 and comp1 do not have satisfactory sensitivities to dwell fatigue.

On the other hand, the alloys of the invention can have an acceptable behaviour for each of the important variables described above, and in particular:

- their oxidation behaviour is more acceptable than that of alloys comp1 and comp2 of the prior art, as witnessed by the parabolic oxidation rate constants $k_p$ which are significantly less than those of alloys comp1 and comp2;
- their mechanical behaviour is defined by the constants Rm/ρ which are substantially close to those of alloys of the prior art with, in particular, an elongation at break that is often higher than those of the alloys of the comparative examples;
- an increased resistance to dwell fatigue compared with the alloy comp3 (and comp1) of the prior art, as witnessed by the value of the α fraction gradient at the β-transus.

Consequently, the alloys of the invention are better candidates for high temperature applications than the alloys of the prior art, because they offer better compromises than the alloys of the prior art, for which at least one property does not allow their use at higher temperature.

Throughout the application and unless otherwise mentioned, all value ranges should be understood to include the limits.

The invention claimed is:

1. A titanium alloy comprising, in content by weight:
4.0% to 5.0% aluminium;
3.50% to 4.50% tin;
1.0% to 4.0% zirconium;
2.0% to 5.25% molybdenum;
1.0% to 2.50% niobium;
0.10% to 0.25% silicon;
0.10% to 0.18% oxygen;
the remainder consisting of titanium and unavoidable impurities,
the alloy having an equivalent aluminium content by weight, denoted Aleq, less than or equal to 8.5% and calculated by application of the following formula: Aleq=+[Sn]/3+[Zr]/6+10*[O] where [Al], [Sn], [Zr] and [O] are the contents by weight in the alloy of aluminium, tin, zirconium and oxygen respectively, the alloy having a fraction of α2-phase at 650° that is less than or equal to 0.2% mol and wherein the alloy has a gradient of a fraction at the β-transus that is less than or equal to 0.89% mol/° C. in absolute value.

2. The titanium alloy according to claim 1, wherein the equivalent aluminium content by weight is between 6.5% and 8.0%.

3. The titanium alloy according to claim 1, wherein the aluminium content by weight is between 4.0% and 4.8%.

4. The titanium alloy according to claim 1, wherein the molybdenum content by weight is between 4.50% and 5.25%.

5. The titanium alloy according to claim 1, wherein the silicon content by weight is between 0.1% and 0.15%.

6. The titanium alloy according to claim 1, wherein the zirconium content by weight is between 1.0% and 2.0%.

7. A turbomachine part comprising an alloy according to claim 1.

8. The turbomachine part according to claim 7, said part being chosen from a compressor blade, a compressor disc, a compressor impeller, a turbomachine casing or a turbomachine nozzle.

9. A turbomachine comprising a part according to claim 7.

10. A titanium alloy comprising, in content by weight:

4.0% to 5.0% aluminium;

3.50% to 4.50% tin;

1.0% to 4.0% zirconium, 2.0% to 5.25% molybdenum;

1.0% to 2.50% niobium;

0.10% to 0.25% silicon;

0.10% to 0.18% oxygen;

the remainder consisting of titanium and unavoidable impurities, the alloy having an equivalent aluminium content by weight, denoted Aleq, less than or equal to 8.5% and calculated by application of the following formula: Aleq=+[Sn]/3+[Zr]/6+10*[O] where [Al], [Sn], [Zr] and [O] are the contents by weight in the alloy of aluminium, tin, zirconium and oxygen respectively, the alloy having a gradient of a fraction at the β-transus that is less than or equal to 0.89% mol/° C. in absolute value.

11. The titanium alloy according to claim 10, wherein the equivalent aluminium content by weight is between 6.5% and 8.0%.

12. The titanium alloy according to claim 10 wherein the aluminium content by weight is between 4.0% and 4.8%.

13. The titanium alloy according to claim 10, wherein the molybdenum content by weight is between 4.50% and 5.25%.

14. The titanium alloy according to claim 10, wherein the silicon content by weight is between 0.1% and 0.15%.

15. The titanium alloy according to claim 10, wherein the zirconium content by weight is between 1.0% and 2.0%.

16. The titanium alloy according to claim 10, wherein the alloy has a fraction of α2-phase at 650° C. that is less than or equal to 0.2% mol.

17. A turbomachine part comprising an alloy according to claim 11.

18. The turbomachine part according to claim 17, said part being chosen from a compressor blade, a compressor disc, a compressor impeller, a turbomachine casing or a turbomachine nozzle.

19. A turbomachine comprising a part according to claim 18.

* * * * *